United States Patent [19]

Buding et al.

[11] Patent Number: 4,631,315
[45] Date of Patent: Dec. 23, 1986

[54] HYDROGENATION OF NITRILE GROUP-CONTAINING UNSATURATED POLYMERS

[75] Inventors: Hartmuth Buding, Dormagen; Paul Fiedler, Cologne; Heinrich Königshofen, Bergisch-Gladbach; Joachim Thörmer, Leverkusen, all of Fed. Rep. of Germany

[73] Assignee: Bayer Aktiengesellschaft, Leverkusen, Fed. Rep. of Germany

[21] Appl. No.: 771,646

[22] Filed: Sep. 3, 1985

[30] Foreign Application Priority Data

Sep. 12, 1984 [DE] Fed. Rep. of Germany ....... 3433392

[51] Int. Cl.$^4$ ................................................ C08F 8/04
[52] U.S. Cl. .................................. 525/338; 525/329.3; 525/339
[58] Field of Search ................................. 525/338, 339

[56] References Cited

U.S. PATENT DOCUMENTS

| | | | |
|---|---|---|---|
| 2,585,583 | 2/1952 | Pinkney | 525/339 |
| 3,366,646 | 1/1968 | Dewhirst | 525/338 |
| 3,766,300 | 10/1973 | De La Mare | 525/339 |
| 3,898,208 | 8/1975 | Krause | 525/338 |
| 3,994,868 | 11/1976 | Inomata et al. | 525/338 |
| 4,486,480 | 12/1984 | Okumoto et al. | 525/338 |

*Primary Examiner*—Joseph L. Schofer
*Assistant Examiner*—Bernard Lipman
*Attorney, Agent, or Firm*—Connolly and Hutz

[57] ABSTRACT

Nitrile group-containing polymers are hydrogenated in a homogeneous phase with preservation of the nitrile groups in a low molecular weight ketone as a solvent and with a compound corresponding to formula $$RuX[(L_1)(L_2)_n]$$

as a catalyst, wherein
X represents hydrogen, halogen
$L_1$ represents hydrogen, halogen, optionally substituted cyclopentadienyl,
$L_2$ represents a phosphane, bisphosphane or arsane and
n is 1, 2 or 3 and
$[(L_1)(L_2)_n]$ represents a cyclopentadienyl bisphosphane.

5 Claims, No Drawings

HYDROGENATION OF NITRILE GROUP-CONTAINING UNSATURATED POLYMERS

The invention relates to a process for the hydrogenation of nitrile group-containing unsaturated polymers with preservation of the nitrile groups.

It is known from U.S. Pat. No. 3,700,637 to hydrogenate the CC double bonds of diene-(meth)acrylonitrile copolymers with a large proportion of alternating diene-nitrile units homogeneously with rhodium halogen complex catalysts in chlorobenzene. The suitability of other metals such as platinum, ruthenium, iridium, palladium, rhenium, cobalt or copper in homogeneous or heterogeneous form is indicated.

DE-OS No. 2 539 132 suggests solvent-dependent selective hydrogenation of butadiene acrylonitrile copolymers with the already known rhodium catalyst during which the CN triple bond and cis double bond are maintained and the vinyl and trans double bonds are hydrogenated quantitatively if chlorobenzene is used as the solvent. Only low degrees of hydrogenation are achieved in other solvents, in particular ketones.

Finally, it is known from DE-OS No. 2 459 115 to hydrogenate unsaturated polyhydroxyhydrocarbons with molecular weights of up to 4000 with preservation of the hydroxyl groups by means of ruthenium catalysts in a homogeneous or preferably heterogeneous manner. Aliphatic hydrocarbons, aromatic hydrocarbons, alcohols, ethers, esters and water can be used as the solvent for heterogeneous hydrogenation. No particulars are given for homogeneous hydrogenation. The polymers should also be able to contain, for example, acrylonitrile as comonomer, but detailed descriptions are not given although it should be noted that it is known from U.S. Pat. No. 3,454,644, example IX, that the nitrile group of benzonitrile can be hydrogenated in homogeneous Ru catalysis in ethanol to form the amino group.

Our own experiments on butadiene acrylonitrile copolymers have demonstrated that very cross-linked products are obtained when using corresponding ruthenium complex catalysts in chlorobenzene, which is a suitable solvent for the hydrogenation of unsaturated nitrile group-containing polymers with rhodium complex catalysts according to the prior art.

As the occurrence of rhodium is very small and rhodium is used not only in the chemical industry, but predominantly in the electrical industry, the glass and ceramic industry and more recently quite specifically in the car industry (exhaust gas catalysts) a shortage of this precious metal in the future cannot be ruled out.

An aim of the present invention was to propose a new homogeneous hydrogenation process for nitrile group-containing unsaturated polymers of any structure with preservation of the nitrile groups, independently of rhodium, with which a quantitative hydrogenation of all CC double bonds is achieved if desired and which leads to rubbers having excellent properties for use.

The aim was surprisingly achieved by homogeneous reaction control using specific ruthenium catalysts in specific solvents.

The object of the invention is therefore the hydrogenation of nitrile group containing polymers in a homogeneous phase with preservation of the nitrile groups, characterised in that a low molecular weight ketone is used as a solvent and a compound corresponding to the formula $$RuX[(L_1)(L_2)_n]$$

is used as a catalyst, wherein
- X represents hydrogen, halogen
- $L_1$ represents hydrogen, halogen, optionally substituted cyclopentadienyl,
- $L_2$ represents a phosphane, bisphosphane or arsane and
- n is 1, 2 or 3 and
- $[(L_1)(L_2)_n]$ represents a cyclopentadienyl-bisphosphane.

X preferably represents chlorine; $L_1$ hydrogen or chlorine and $L_2$ a triaryl phosphane.

Examples of $L_1$ ligands are cyclopentadienyl, pentamethyl-cyclopentadienyl, ethyltetramethyl-cyclopentadienyl, pentaphenyl-cyclopentadienyl and dimethyl-triphenyl-cyclopentadienyl. Chlorine and cyclopentadienyl are preferred $L_1$ ligands.

Examples of $L_2$-ligands are those which correspond to the formulae $$R_1-P-R_2 \text{ and } R_1-As-R_2$$
$$\underset{R_3}{|} \qquad \underset{R_3}{|}$$

in which $R_1$, $R_2$ and $R_3$ which may be the same or different represent alkyl, cycloalkyl, aryl or aralkyl radicals, these radicals optionally being substituted by alkyl, hydroxy, alkoxy, carbalkoxy or halogen groups.

Alkyl radicals in this case are, for example, straight-chained or branched saturated hydrocarbon radicals containing from 1 to 20, preferably from 1 to 12, particularly preferably from 1 to 6 carbon atoms.

Cycloalkyl radicals are, for example, cyclic, saturated hydrocarbon radicals containing from 5 to 12, preferably 5 to 7 carbon atoms.

Aryl radicals are, for example, aromatic hydrocarbon radicals from the benzene series containing from 6 to 18, preferably from 6 to 12 carbon atoms.

Aralalkyl radicals are, for example, alkyl radicals substituted by aryl which, in the aliphatic portion, consist of a straight-chained or branched hydrocarbon radical containing from 1 to 6 carbon atoms and, in the aromatic portion, consist of one radical from the benzene series, preferably phenyl.

The above-mentioned alkyl, cycloalkyl, aryl and aralkyl radicals may optionally be substituted by $C_1$- to $C_6$-alkyl, hydroxy, $C_1$- to $C_6$-alkoxy, $C_1$- to $C_6$-carbalkoxy, fluorine or chlorine.

Triphenylphosphane, diethylphenylphosphane, tritolylphosphane, trinaphthylphosphane, diphenylmethylphosphane, diphenylbutylphosphane, tris-(p-carbomethoxyphenyl)-phosphane, tris-(p-cyanophenyl)-phosphane, tributylphosphane, tris-(trimethoxyphenyl)-phosphanes, bis-(trimethylphenyl)-phenyl-phosphanes, bis-(trimethoxyphenyl)-phenylphosphanes, trimethylphenyldiphenylphosphanes, trimethoxyphenyldiphenyl-phosphanes, tris-(dimethylphenyl)-phenylphosphanes, tris-(dimethoxyphenyl)-phosphanes, bis-(dimethylphenyl)-phenyl-phosphanes, bis-(dimethoxyphenyl)-phenylphosphanes, dimethylphenyldiphenylphosphanes, dimethoxyphenyldiphenylphosphanes, triphenylarsane, ditolylphenylarsane, tris-(4-ethoxyphenyl)-arsane, diphenylcyclohexylarsane, dibutylphenylarsane and diethylphenylarsane are preferred $L_2$ ligands.

Further examples of $L_2$ ligands are bisphosphanes corresponding to the formula

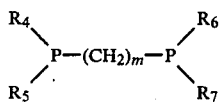

in which m represents an integer from 1 to 10 and the radicals $R_4$, $R_5$, $R_6$, $R_7$ which may be the same or different have the same meaning as $R_1$.

Examples of bisphosphanes are 1,2-bis-diphenylphosphanoethane, 1,2-bis-dianisylphosphanoethane, preferably 1,3-bis-diphenylphosphanopropane and, in particular, 1,4-bis-diphenylphosphanobutane.

Examples of $[(L_1)(L_2)_n]$-ligands are compounds corresponding to the formula

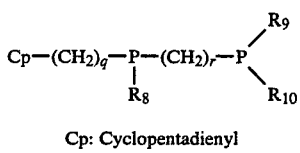

Cp: Cyclopentadienyl wherein q and r which may be the same or different represent an integer from 1 to 6 and the radicals $R_8$, $R_9$ and $R_{10}$ which may be the same or different have the same meaning as $R_1$.

Examples of such ligands are 1,4-diphospha-6-cyclopentadienyl-1,1,4-triphenylhexane, preferably 1,5-diphospha-7-cyclopentadienyl-1,1,5-triphenylheptane and, in particular, 1,6-diphospha-8-cyclopentadienyl-1,1,6-triphenyloctane.

The ruthenium complexes used are known (see M. I. Bruce, N. J. Windsor, Aust. J. Chem 30 (1977), pages 1601 to 1604 and T. Kauffmann, J. Olbrich, Tetrahedron Letters 25 (1984), pages 1967–1970) and can be obtained, for example by reaction of hydrated ruthenium trichloride with an excess of the ligands $L_1$ and $L_2$ in ethanol.

Ruthenium complexes with X=bromine or iodine can be obtained, for example, simply by heating the corresponding ruthenium complexes of the formula in which X=hydrogen with HBr or HI in methanol (see T. Wilczewsky, M. Bochenska, J. F. Biernat in J. Organomet. Chem. 215 (1981), pages 87 to 96).

Suitable solvents for hydrogenation include, in particular, acetone, butanone, pentanone, cyclopentanone and cyclohexanone.

The unsaturated and the hydrogenated polymers should both be soluble in the solvent used.

The process is suitable for the hydrogenation of copolymers of from 85 to 50% by weight, preferably 82 to 55% by weight of at least one conjugated diene, from 15 to 50% by weight, preferably from 18 to 45% by weight of at least one unsaturated nitrile and from 0 to 10% by weight, preferably from 0 to 8% by weight of at least one further monomer which can be copolymerised with conjugated dienes and unsaturated nitriles.

Suitable conjugated dienes are, for example, butadiene-1,3, 2-methylbutadiene-1,3 2,3-dimethylbutadiene-1,3 and pentadiene-1,3 and suitable unsaturated nitriles are acrylonitrile and methacrylonitrile.

Vinyl aromatic substances such as styrene, o-, m- or p-methylstyrene, ethylstyrene, vinylnaphthalene and vinylpyridine, α,β-unsaturated monocarboxylic acids containing from 3 to 5 carbon atoms such as acrylic acid, methacrylic acid and crotonic acid as well as α,β-unsaturated dicarboxylic acids containing from 4 to 5 carbon atoms such as maleic, fumaric, citraconic and itaconic acid, also vinyl chloride, vinylidene chloride, N-methylolacrylamide and vinylalkylether containing from 1 to 4 carbon atoms in the alkyl portion are further suitable monomers.

A binary copolymer of butadiene and acrylonitrile is preferably hydrogenated.

The molecular weight of the polymers is not critical and lies between 500 and 500,000 g/mol, preferably between 1000 and 200,000 g/mol and in particular between 30,000 and 150,000 g/mol (numerical average determined by gel permeation chromatography).

The degrees of hydrogenation (percentage of the hydrogenated CC- double bonds based on the total number of the CC- double bonds originally present in the polymer) can be up to 100%. However, hydrogenation can be interrupted before-hand if necessary. Polymers having degrees of hydrogenation exceeding 80%, in particular exceeding 90%, preferably exceeding 95% and particularly preferably exceeding 99% are obtained by the process according to the invention.

The concentration of catalyst, based on polymer (calculated as ruthenium) is from 10 to 1000, preferably from 40 to 600 ppm. The concentration of unsaturated polymer, based on the total solution, is from 1 to 99, preferably from 5 to 40% by weight.

Hydrogenation is preferably carried out at from 80° to 200° C., preferably at 100° to 180° C., in particular at 120° to 160° C. and at 20 to 350 bar, preferably at 30 to 250 bar hydrogen pressure.

After hydrogenation, the polymer is separated from the solution by conventional methods, for example by (vacuum) evaporation, by blowing in water vapour or by addition of a non-solvent. A drying treatment is then carried out to remove remaining solvent or water.

If diene-(meth)acrylonitrile copolymers are hydrogenated according to the prior art in chlorobenzene with rhodium complex catalysts and if the reaction solutions are worked up to produce the solid polymers by blowing in water vapour, thick pancakes of polymer are deposited on the wall and stirrer of the stripper necessitating periodic opening of the stripper for mechanical cleansing. The ejected moist polymer crumbs also clog the water draining colander within a short period so the colander has to be cleansed continuously.

It has surprisingly been found that the polymer solutions obtained by the process according to the invention can be worked up by blowing in water vapour to produce the solid polymer without difficulty and without clogging of the stripper wall, the stirrer and the draining colander and that mechanical cleansing of the stripper on completion of the processing is not necessary.

The polymers which are hydrogenated according to the invention are hardened in a conventional manner by peroxide or sulphur vulcanization provided that vulcanization is not carried out by radiation cross-linking.

Owing to their excellent resistance to weathering, ozone, oil and hot air as well as their resistance to cold climates, these polymers can be used for high quality rubber articles such as seals, tubes, membranes and for cable insulators and sheaths.

EXAMPLE 1

A solution carefully purged with nitrogen of 220 g of a statistical butadiene acrylonitrile copolymer containing 34.9% by weight of acrylonitrile and having a Mooney viscosity ML 1+4 (100° C.) of 29 in 1980 g of chlorobenzene was placed in a 3 l autoclave under nitrogen purging. During further rendering inert, a solution also purged with nitrogen of 0.385 g of tris(triphenylphosphane)ruthenium(II)chloride and 2.0 g of triphenylphosphane in 55 g of chlorobenzene was added and 80 bar of hydrogen was applied. The mixture was heated to 130° C. and the reaction was then continued at 140 bar hydrogen pressure for 4 hours at 130° C.

A tough foamed plastic mass swollen with solvent was obtained as the reaction product and could not be dissolved either by further addition of chlorobenzene or by addition of butanone.

EXAMPLE 2

A carefully degassed solution containing 2.1 kg of the same polymer as in Example 1 in 17.9 kg of butanone was placed in a 40 l autoclave rendered inert with nitrogen. The mixture was heated to 150° C., a carefully degassed solution of 3.327 g of tris(triphenylphosphane)ruthenium(II)chloride in 1.6 kg of butanone was added and the mixture was hydrogenated for 4 hours at 140 bar hydrogen pressure. The butanone was removed by blowing in water vapour and the polymer was dried under vacuum.

Further polymers were produced at various reaction temperatures in a similar manner. Table 1 shows the polymer data (I) as a function of the reaction temperature (°C.), [a] representing the degree of hydrogenation (% determined by infrared spectroscopy), [b] the gel value (%, measured in butanone), [c] the Mooney viscosity ML 1+4 (100° C.); [d] the Defo viscosity $V_{10}$ (N.s, 80° C.) (R. Koopmann, Kautschuk+Gummi, Kunststoffe 36, No. 2, pages 108 et seq (1983)), [e] the Defo eleasticity $DE_{30}$ (1/10 mm, 80° C.) (see literature as under [d]) and [f] the Mooney relaxation MR (% 100° C.) (R. Koopmann, H. Kramer, J. of Testing and Evaluation Vol. 12, No. 6, November 1984; submitted at the ASTM Symposium on "Processibility and Rheology of Rubber" in Toronto on 21st. June 1982). In order to measure the Mooney viscosity ML, 150 g of polymer were passed twice through a 450 mm wide laboratory rolling mill (coolant temperature 20° C., nip 0.4 mm, friction 1:1.2, front roller 20 rpm). After storing the sheet for at least 30 minutes, further testing was carried out in accordance with DIN 53 523, parts 2 and 3. The Mooney relaxation was measured with the rest of the Defo sheet (see literature on [d]).

EXAMPLE 3

Mixtures having the following formulation were obtained from the polymers produced according to Example 2:

100.00 parts by weight hydrogenated polymer
2.00 parts by weight zinc oxide
2.00 parts by weight magnesium oxide
1.00 part by weight styrenated diphenylamine
0.40 parts by weight zinc salt of 2-mercaptobenzimidazole
45.00 parts by weight carbon black N 550
1.50 parts by weight triallylisocyanurate
7.00 parts by weight bis(tetiarybutylperoxyisopropyl)benzene Table 1 lists the values for the vulcanizates (II) determined as a function of the hydrogenation temperature. Vulcanization was carried out for 15 minutes at 180° C. Tempering was then carried out for 6 hours at 150° C. The S2 rod was used as the sample.

The standards DIN 53 504, 53 505, 53 512 and 53 517 (standard sample A) were used for measurement in this example and in example 5, F representing the tensile strength, D the breaking elongation, $M_{100}$ and $M_{200}$ the tension value at 100 and 200% elongation, $H_{23}$ the Shore A hardness at 23° C., $E_{23}$ the resilience at 23° C. and DVR the compression set at 150° C./70 h.

EXAMPLE 4

The mixture was hydrogenated for 4 hours in accordance with Example 2 at 140° C. and 140 bar hydrogen pressure with differing quantities of tris(triphenylphosphane)ruthenium(II)chloride.

Table 2 shows the polymer data (I) as a function of the ruthenium concentration used (ppm, based on the polymer).

EXAMPLE 5

In accordance with Example 3, mixtures were produced from the polymers according to Example 4, and processed.

Table 2 lists the vulcanizate properties (II) as a function of the ruthenium concentration (ppm, based on the polymer).

TABLE 1

| | | | Reaction temperature | | | |
|---|---|---|---|---|---|---|
| | | | 150 | 140 | 135 | 130 |
| (I) | [a] | | 99.1 | 98.7 | 99.8 | 99.7 |
| | [b] | | 1.7 | 1.4 | 2.3 | 2.3 |
| | [c] | | 80 | 86 | 102 | 98 |
| | [d] | | 190.1 | 223.8 | 315.4 | 301.2 |
| | [e] | | 33.7 | 37.0 | 44.3 | 42.4 |
| | [f] | | 9.7 | 12.4 | 19.7 | 18.1 |
| (II) | F | [MPa] | 24.8 | 25.1 | 27.1 | 26.1 |
| | D | [%] | 285 | 255 | 300 | 295 |
| | $M_{100}$ | [MPa] | 5.2 | 6.2 | 5.5 | 5.3 |
| | $M_{200}$ | [MPa] | 16.3 | 19.1 | 17.8 | 17.0 |
| | $H_{23}$ | [−] | 71 | 72 | 70 | 72 |
| | $E_{23}$ | [%] | 38 | 38 | 37 | 39 |
| | DVR | [%] | 47.3 | 42.5 | 43.1 | 47.2 |

TABLE 2

| | | | Ru concentration | | | |
|---|---|---|---|---|---|---|
| | | | 300 | 167 | 100 | 75 |
| (I) | [a] | | 97.4 | 98.7 | 98.0 | 94.2 |
| | [b] | | 1.5 | 1.4 | 1.7 | 2.5 |
| | [c] | | 90 | 86 | 78 | 76 |
| | [d] | | 288.6 | 223.8 | 184.2 | 191.5 |
| | [e] | | 39.8 | 37.0 | 34.8 | 34.6 |
| | [f] | | 18.9 | 12.4 | 9.4 | 9.0 |
| (II) | F | [MPa] | 26.8 | 25.1 | 25.7 | 25.1 |
| | D | [%] | 260 | 255 | 300 | 300 |
| | $M_{100}$ | [MPa] | 7.7 | 6.2 | 5.3 | 5.3 |
| | $M_{200}$ | [MPa] | 20.9 | 19.1 | 16.7 | 16.4 |
| | $H_{23}$ | [−] | 73 | 72 | 71 | 72 |
| | $E_{23}$ | [%] | 39 | 38 | 37 | 38 |
| | DVR | [%] | 43.3 | 42.5 | 39.8 | 40.9 |

EXAMPLE 6

In accordance with Example 2, the polymer solution was placed in the 40 l autoclave rendered inert with nitrogen. The catalyst solution was added at 125° C. and 25 bar hydrogen pressure and hydrogenation was continued for 4 hours at 135° C. and 140 bar hydrogen pressure.

The following polymer data were found

| [a] | [b] | [c] | [d] | [e] | [f] |
|---|---|---|---|---|---|
| 98.7 | 1.1 | 90 | 270.4 | 41.0 | 15.9 |

EXAMPLE 7

In accordance with Example 2 a statistical butadiene-acrylonitrile-copolymer containing 37.6% by weight of acrylonitrile and a Mooney viscosity of 34 was hydrogenated at 135° C.

The results are as follows:

| [a] | [b] | [c] | [d] | [e] | [f] |
|---|---|---|---|---|---|
| 99.6 | 1.3 | 105 | 283 | 41.7 | 15.2 |

EXAMPLE 8

A carefully degassed solution of 2.1 kg of the same polymer as in Example 1 in 17.9 kg of acetone was placed in a 40 l autoclave rendered inert with nitrogen. The mixture was heated to 135° C., a carefully degassed solution of 5.977 g tris(triphenylphosphane)ruthenium-(II)chloride in 1.6 kg of acetone was added and the mixture hydrogenated for 4 hours at 140 bar hydrogen pressure.

The following results were obtained:

| [a] | [b] | [c] | [d] | [e] | [f] |
|---|---|---|---|---|---|
| 99.5 | 1.6 | 98 | 323 | 45.5 | 20.5 |

We claim:

1. In a process for the hydrogenation of at least 80% of olefinic bonds contained in an unsaturated copolymer derived from:
   85 to 50%, by weight, conjugated diene,
   15 to 50%, by weight, unsaturated nitrile,
   0 to 10%, by weight, of a monomer copolymerizable with the conjugated diene and the unsaturated nitrile,
with preservation of the nitrile groups, the improvement comprising, hydrogenating in the presence of a low molecular weight ketone solvent with a catalyst of the formula $$RuX[(L_1)(L_2)_n]$$

wherein X is hydrogen or halogen,
  $L_1$ is hydrogen, halogen, cyclopentadienyl, or methyl, ethyl or phenyl substituted cyclopentadienyl,
  $L_2$ is a phosphane, bisphosphane or arsane,
  n is 1, 2 or 3,
  or $[(L_1)(L_2)_n]$ is a cyclopentadienyl-bisphosphane,
where the concentration of the catalyst, calculated as Ruthenium and based on the unsaturated polymer, is from 10 to 1000 ppm and the concentration of the unsaturated copolymer, based on the total solution, is from 1 to 99% by weight.

2. A process according to claim 1, wherein X is chlorine, $L_1$ is hydrogen or chlorine and $L_2$ is a triarylphosphane.

3. A process according to claim 1, wherein X is hydrogen or chlorine, $L_1$ is cyclopentadienyl and $L_2$ is triarylphosphane.

4. A process according to claim 1, where 100% of the olefinic bonds are hydrogenated.

5. A process according to claim 1, wherein the hydrogenation is carried out at a temperature of from 80° to 200° C. and a pressure of from 20 to 350 bar hydrogen.

* * * * *